US012023687B2

(12) United States Patent
Ross

(10) Patent No.: US 12,023,687 B2
(45) Date of Patent: Jul. 2, 2024

(54) FROTH FLOTATION APPARATUS

(71) Applicant: Mintek, Randburg (ZA)

(72) Inventor: Victor Emul Ross, Randburg (ZA)

(73) Assignee: MINTEK (ZA)

( * ) Notice: Subject to any disclaimer, the term of this patent is extended or adjusted under 35 U.S.C. 154(b) by 850 days.

(21) Appl. No.: 17/057,174

(22) PCT Filed: Apr. 12, 2019

(86) PCT No.: PCT/ZA2019/050021
§ 371 (c)(1),
(2) Date: Nov. 20, 2020

(87) PCT Pub. No.: WO2019/227109
PCT Pub. Date: Nov. 28, 2019

(65) Prior Publication Data

US 2021/0205823 A1 Jul. 8, 2021

(30) Foreign Application Priority Data

May 21, 2018 (ZA) ................................ 2018/03343

(51) Int. Cl.
*B03D 1/14* (2006.01)
*B03D 1/24* (2006.01)

(52) U.S. Cl.
CPC ........... *B03D 1/1456* (2013.01); *B03D 1/247* (2013.01)

(58) Field of Classification Search
None
See application file for complete search history.

(56) References Cited

U.S. PATENT DOCUMENTS 3,984,001 A * 10/1976 Nagano .................... B03D 1/16 261/93
4,394,258 A 7/1983 Zipperian
2008/0251427 A1 10/2008 Mankosa et al.
2008/0308502 A1* 12/2008 Jameson .................. B03D 1/02 210/703

FOREIGN PATENT DOCUMENTS

WO 2006081611 A1 8/2006
WO 2008156795 A1 12/2008

OTHER PUBLICATIONS

International Search Report and Written Opinion for Application No. PCT/ZA2019/050021 dated Aug. 9, 2019 (9 pages).
International Preliminary Report on Patentability for Application No. PCT/ZA2019/050021 dated Jul. 27, 2020 (10 pages).

* cited by examiner

*Primary Examiner* — Peter Keyworth
(74) *Attorney, Agent, or Firm* — Michael Best & Friedrich LLP

(57) ABSTRACT

A froth flotation apparatus including a tank defining an interior, for holding a slurry, an aerator for aerating a mineral feed stream entering the interior and a system for feeding the aerated mineral stream into a contactor located in the tank.

16 Claims, 2 Drawing Sheets

FROTH FLOTATION APPARATUS

BACKGROUND OF THE INVENTION

This invention relates to an apparatus which makes use of froth flotation techniques to recover valuable minerals from ore.

In a froth flotation process a finely ground ore is pulped and conditioned with chemical reagents to promote the attachment of valuable mineral particles to air bubbles that are dispersed in a slurry. The contacting of the conditioned slurry with air can be done in different ways for example mechanically, using rotor/stator assemblies, or pneumatically, using an aerator. With these techniques the hydrodynamic conditions are, however, such that the air bubbles entrain significant quantities of unwanted gangue material into the froth and the concentrate. In order to reject the unwanted material, the depth of the froth may be increased, or the froth may be washed. Each process, however, leads to a reduced recovery of valuable minerals.

A challenge posed by entrained material is presented in the Platinum Group Mineral (PGM) industry in South Africa where the UG2 reef is a chromitite ore with chromite ($FeO{\cdot}Cr_2O_3$) as a principal gangue constituent. As chromite is a spinel and is stable at temperatures of up to 2000° C. the entrainment of chromite particles into the froth concentrate causes problems in downstream smelting operations. Inter alia the chromite particles could damage a furnace lining and accumulate in the hearth of a furnace leading to reduced smelting capacity. The chromite content of a concentrate should be limited, typically, to less than 3% by mass to minimize the aforementioned problems.

The invention is concerned with a pneumo-mechanical process in which the contamination of a froth flotation concentrate by gangue is reduced, while maintaining the recovery of a valuable mineral at a level at which the overall economic feasibility of the process is enhanced.

SUMMARY OF THE INVENTION

The invention provides a froth flotation apparatus for treating a mineral feed stream, the apparatus including a tank which defines an interior for holding a slurry, at least one contactor in the tank, at least one aerator for aerating the mineral feed stream, and a system for feeding the aerated mineral stream into the contactor.

The contactor may be elongate and may extend downwardly in the interior of the tank so that in use the contactor is at least partially immersed in the slurry contained in the tank.

An upper region of the contactor may include an aperture through which the aerated mineral stream is introduced into the contactor.

The contactor may include at least one exit zone at which the mineral stream can exit the contactor and enter the interior of the tank. Preferably the exit zone is configured so that the mineral stream exits in a generally radial direction from the contactor.

The contactor preferably includes an agitator which is configured to shear the aerated mineral stream in the contactor, and to subject the mineral stream to a shear action—this is at a location which is upstream of the exit zone.

Preferably the contactor includes a plurality of exit zones which may be spaced vertically from one another at intervals along a length of the contactor.

A control mechanism may be provided at each exit zone to regulate the release rate of the mineral stream from the contactor A level controller may be included to control a level of the slurry in the tank.

The level controller may be in the form of a controlled outlet from a lower region of the tank.

A launder may be included to collect overflow from the tank.

Optionally, a lower end of the contactor may be open and may oppose a baffle, inside the tank, to minimise the likelihood of mineral feed, exiting the contactor, being directed to a tailing's outlet of the tank.

The tank may be of any appropriate shape but, preferably, is cylindrical.

The aerator may comprise a static mixer, a venturi or the like. The nature of the aerator is non-limiting. Use may be made of a plurality of aerators and a plurality of contactors.

The contactor in cross section may be of any suitable shape but preferably is circular.

The invention also extends to a method of treating a mineral feed stream using an apparatus of the aforementioned kind which includes the steps of:

a. using the aerator to aerate the mineral feed stream;
b. feeding the aerated mineral feed stream into the contactor;
c. mixing the mineral feed stream in the contactor and subjecting the mineral stream to a shear action; and
d. regulating the rate of release of the mineral stream, and mineralized bubbles contained therein, from the contactor into the interior of the tank.

The mineral stream may be a slurry which includes particles finely ground to a predetermined particle size.

The mineral stream may be preconditioned with one or more suitable reagents to facilitate a subsequent froth flotation process. Through the use of multiple exit zones the aerated mineral stream in the contactor may be released from the contactor in stages into an adjacent volume of slurry in the tank. This process allows for the promotion of a high gas holdup inside the tank adjacent the respective exit zone and leads to the establishment of conditions in the slurry which resemble conditions which prevail in a fluidized bed.

Mineralized bubbles may be released in the slurry at regions adjacent each exit zone, and rise slowly inside the slurry to promote segregation of valuable mineral from unwanted gangue.

The mineral stream which is aerated may comprise a combination of a fresh mineral stream and a variable recycled portion taken from a tailings stream from the tank.

The level of the slurry surface inside the tank, and hence the depth of a froth layer on the slurry surface, may be regulated by means of a level controller.

The level controller may be in the form of a controlled outlet from a lower region of the tank.

Froth overflow from the tank may be collected in a launder and the concentrate may then be recovered for further processing.

A lower end of the contactor may be open and may oppose a baffle, inside the tank, to minimise the likelihood of mineral feed exiting the contactor being directed to a tailings outlet of the tank.

The tank may be of any appropriate shape but, preferably, is circular cylindrical.

The aerator may comprise a static mixer, a venturi or the like. The nature of the aerator is non-limiting. Use may be made of a plurality of aerators and a plurality of contactors.

The contactor in cross section may be of any suitable shape but preferably is circular.

BRIEF DESCRIPTION OF THE DRAWINGS

The invention is further described by way of example with reference to the accompanying drawings in which.

DESCRIPTION OF PREFERRED EMBODIMENT

Figure 1:
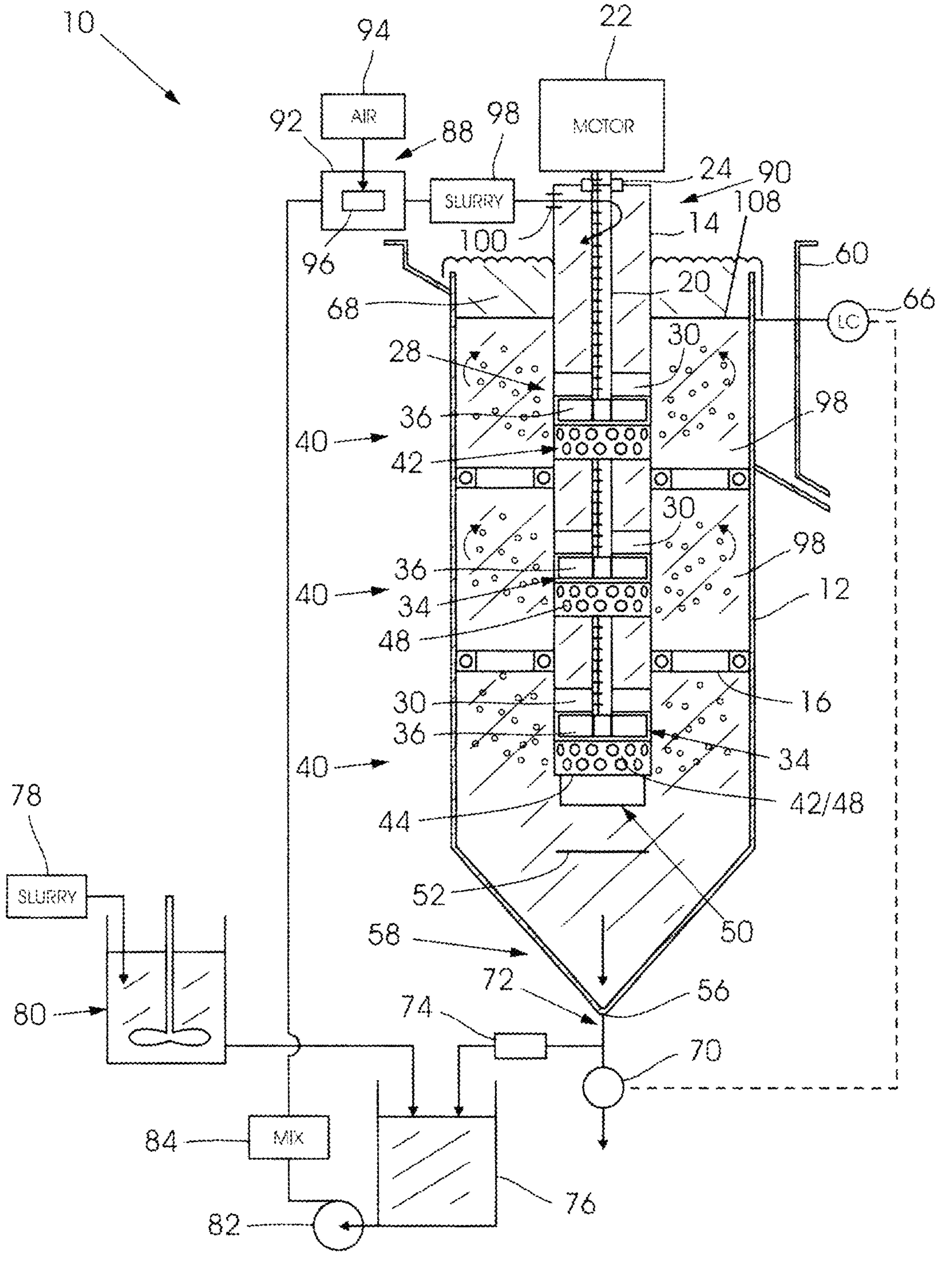
FIG. 1 illustrates from one side and in cross section a froth flotation apparatus according to the invention, and FIG. 2 graphically depicts the relationship of gangue grade as a function of PGM recovery for the apparatus of the invention, compared to prior art arrangements.

FIG. 1 of the accompanying drawings illustrates from one side and in cross section a froth flotation apparatus 10 which comprises a pneumo-mechanical cell, according to the invention.

The apparatus 10 includes a tank 12 which is of any suitable shape but which, conveniently, is circular cylindrical. An elongate, tubular, circular cylindrical downcomer or contactor 14 is centrally positioned inside the tank and extends vertically downwardly inside the tank. The contactor 14 in the embodiment is fixed to a wall of the tank and is supported by means of a plurality of spaced apart supports 16. The invention is, however not limited in this respect.

An elongate shaft 20 extends from an overhead electrical drive motor 22 (or a connected pulley) through a seal 24 at an upper end of the contactor 14 vertically down inside the contactor 14. The shaft 20, which is suitably supported, extends through a plurality of stators 28 which are located at spaced apart intervals along the length of the shaft. Each stator 28 comprises a set of blades 30 which, preferably, are vertically disposed. A respective rotor 34 is fixed to the shaft 20 underlying each stator 28. Each rotor 34 includes a plurality of blades 36 which are closely spaced from adjacent lower edges of the stator blades 30. Similarly, stators 28 may also be provided below the rotors 34.

The contactor 14 has a plurality of exit zones 40 with each exit zone being positioned immediately below a corresponding rotor-stator assembly 34, 28. Each exit zone 40 includes a plurality of outlets 42 of any suitable shape, in the wall of the contactor 14. A respective circular sleeve 44 surrounds the outlets 42 at each exit zone. Each sleeve 44 is formed with a plurality of outlets 48. If the sleeve 44 is rotated, the outlets 48 in the sleeve can be brought into register with the outlets 42 in the wall of the contactor 14 at the respective exit location. It is possible though to rotate the sleeve so that solid portions of the sleeve 44 block the outlets 42 in the contactor 14 to an increasing extent. In this way the flow of material from the contactor 14 through the outlets 42 at a respective exit zone 40 into the interior of the tank 12 can be regulated.

A lower end 50 of the contactor 14 is at least partially open and preferably faces a baffle 52. The function of the baffle is to prevent material flowing from the lower end 50 directly to an outlet 56 at a lower end 58 of the tank. In this way short-circuiting of material flow from the contactor 14 is inhibited.

A launder 60 is located at an upper end 62 of the tank 12 and is configured to collect a froth concentrate overflow from the upper end 62. A level controller 66 is used to control the depth of a froth layer 68 at the upper end 62. The level controller may comprise a valve 70, at the lower end 58, which is operable to control the rate of slurry flow from the lower end of the tank.

Some of the tailings 72 from the tank are directed through a control valve 74 to a sump 76. A fresh feed slurry 78, comprising a finely ground ore which is to be processed, is fed to a mixer 80. The fresh feed 78 is preconditioned with one or more chemical reagents to facilitate a subsequent froth flotation process.

An outlet from the mixer 80 directs the fresh feed to the sump 76. A pump 82 is used to feed a mix 84 of the fresh feed slurry 78 and the tailings 72 from the sump 76 to an aerator 88 which is close to an upper end 90 of the contactor 14. The aerator 88 may be of any appropriate kind e.g. it may comprise a vessel 92 into which air 94 is directed and dispersed by suitable means 96 in the incoming slurry mix 84 in the form of dispersed fine bubbles. The aerated slurry 98 from the aerator 88 is directed through an aperture 100 in an upper wall of the contactor 14 into a region at the upper end 90 of the contactor 14.

In use of the apparatus 10 the shaft 20 is rotated by the motor 22 and the rotors 34 are driven at a high speed past the respective stators 28. The slurry in the contactor 14 is subjected to intimate mixing at the interface of each respective rotor and stator assembly and fine air bubbles in the slurry are further dispersed thus promoting the attachment of valuable mineral particles to the bubbles.

At each exit zone 40 a volume of aerated slurry 98 containing bubbles loaded with mineral particles is released from the contactor 14 into a region between the contactor 14 and a wall of the tank 12. This is accomplished in a stage-wise fashion downstream of each rotor-stator assembly at the respective exit zone 40. As noted the rate of outflow of the aerated slurry at each exit zone 40 can be regulated by rotating the respective sleeve 44 relative to the contactor 14. Other suitable and automated ways of regulating the outflow of the aerated slurry may also be employed.

The configuration of the apparatus 10 is such that the aerated slurry is projected from the contactor 14 radially outward from the contactor towards the wall of the tank. The slurry impinges on the wall and this creates a backwash flow. This leads to the establishment of a zone in the slurry which is characterized by a high gas buildup and a strong downwards flow, or negative bias, of the slurry in which mineral particles can segregate according to their relative densities. The denser and coarser mineral particles that are not attached to air bubbles gravitate downwardly towards the lower end 58 of the tank 12, while the particles that are attached to air bubbles, also referred to as mineralized bubbles, slowly rise to a surface 108 of the slurry volume in the tank.

The level of the slurry surface 108 and hence the depth of the froth layer 68 on the surface 108 can be regulated by means of the valve 70 that regulates the flow of tailings from the tank 12. The froth overflows into the launder 60 which has at least one outlet. Water can be used to flush the concentrate from the outlet.

The pre-aeration of the preconditioned mineral stream, emptying the slurry containing finely ground minerals, which is fed to the contactor 14 leads to the establishment of a zone of micro-shear conditions inside the tank at each exit zone. This favours the recovery of fine and ultra-fine valuable particles.

The regulated release of mineralized bubbles at each exit zone 40 of the contactor 14 ensures that high floatable material is released from the contactor but in a controlled manner. The lateral flow of the aerated slurry from the contactor at each exit zone 40 promotes a high gas holdup which enhances the secondary recovery of valuable particles and reduces the entrainment of gangue material such as chromite.

Figure 2:
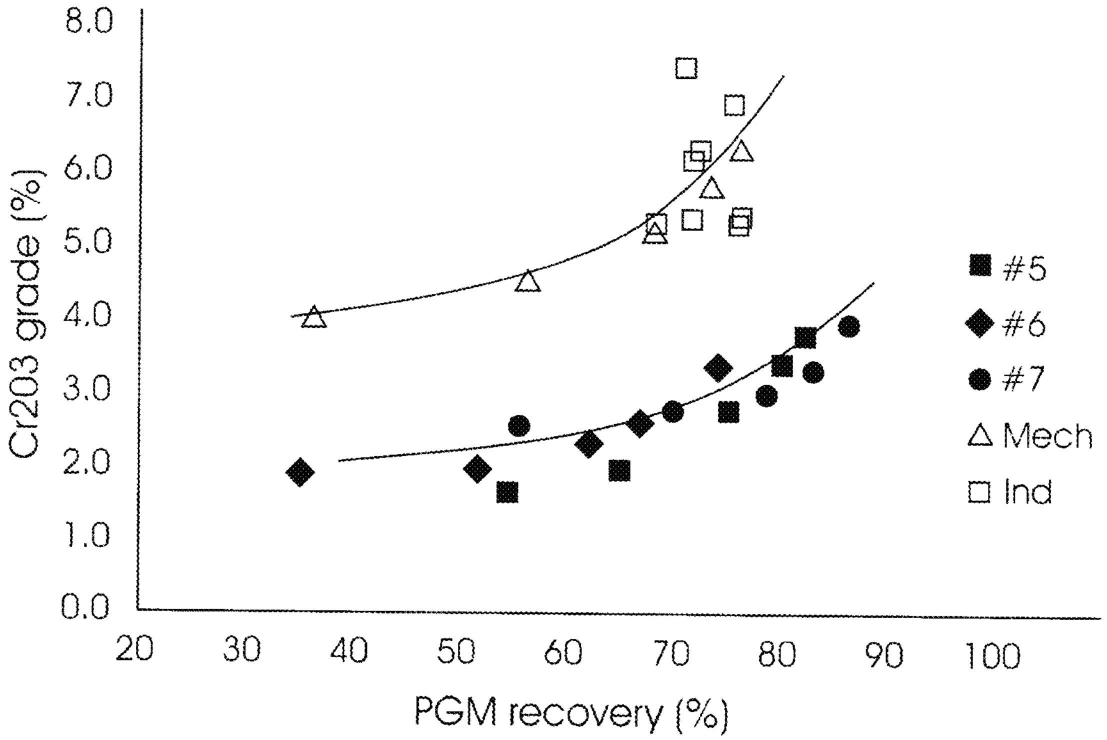

Results (#5, #6, #7) obtained from the apparatus of the invention have been compared to results from a mechanical flotation cell (labelled Mech) as well as results from a series of reagent optimization tests in industry (Ind), are shown in FIG. 2 which illustrates on a vertical axis the percentage grade of $Cr_2O_3$ (chromite) while the horizontal axis illustrates the percentage recovery of PGM.

It is evident that the recovery of PGM using the apparatus 10 is achieved with a significant reduction of $Cr_2O_3$ content.

The significantly improved selectivity of the apparatus 10 is due to the stage-wise release of the aerated slurry from the agitated contactor 14 which leads to the creation of conditions in which the superficial velocity profiles of air and slurry change axially within a separation zone thereby aiding segregation of chromite-rich fractions in the separation zone.

The intense mixing and shear action in the contactor favour the attachment of valuable mineral particles to the finely dispersed air bubbles and result in rapid flotation kinetics. The aerated slurry can exit the contactor after each rotor/stator set in a controlled fashion. The radial exit of the slurry into the separation zone results in a high gas holdup and a clearly visible segregation of silica-rich and chromite-rich fractions in the slurry.

The invention claimed is:

1. A froth flotation apparatus for treating a mineral feed stream, the apparatus comprising a tank defining an interior for holding a slurry, at least one contactor in the tank, at least one aerator for aerating the mineral feed stream to provide an aerated mineral feed stream, a system for feeding the aerated mineral feed stream into the contactor, an agitator to shear the aerated mineral feed stream in the contactor, the contactor including a plurality of exit zones, which are spaced vertically from one another at intervals along a length of a contactor zone at which the aerated mineral feed stream can exit the contactor and enter the interior of the tank, each exit zone including a first plurality of outlets in a wall of the contactor and being positioned immediately below a corresponding rotor-stator assembly, and a control mechanism, in the form of a respective circular sleeve formed with a second plurality of outlets which surrounds each exit zone, the sleeve being rotatable relative to the contactor to regulate the release rate of the aerated mineral feed stream from each of the exit zones.

2. The apparatus according to claim 1 wherein the contactor is elongate and extends downwardly in the interior of the tank and, in use, is at least partially immersed in slurry contained in the tank.

3. The apparatus according to claim 2 wherein the contactor has an upper end which includes an aperture through which the aerated mineral feed stream is introduced into the contactor.

4. The apparatus according to claim 1 wherein the exit zones are configured to direct the aerated mineral feed stream outwardly in a generally radial direction from the contactor.

5. The apparatus according to claim 1 further comprising a level controller to control a level of the slurry in the tank.

6. The apparatus according to claim 1 wherein a lower end of the contactor is located inside the tank and opposes a baffle to minimise the likelihood of the aerated mineral feed stream exiting the contactor via the lower end from being directed to a tailings outlet of the tank.

7. The apparatus according to claim 1 wherein the aerator comprises one of a static mixer and a venturi.

8. The apparatus according to claim 1 wherein the contactor has a circular cross-section.

9. The apparatus according to claim 1 further comprising a plurality of the aerators and a plurality of the contactors.

10. A method of treating a mineral feed stream using an apparatus according to claim 1, the method comprising the steps of:

aerating the mineral feed stream;

feeding the aerated mineral feed stream into an interior of the contactor;

mixing the aerated mineral feed stream in the contactor and subjecting the aerated mineral feed stream to a shear action; and at each of the exit zones, regulating a rate of release of the aerated mineral feed stream and mineralized bubbles contained therein from the contactor into the interior of the tank.

11. The method according to claim 10 wherein the mineral feed stream is a slurry which includes particles which are finely ground to a predetermined particle size.

12. The method according to claim 10 further comprising preconditioning the mineral feed stream with a reagent to facilitate a subsequent froth flotation process.

13. The method according to claim 10 further comprising releasing the aerated mineral feed stream from the contactor in stages into an adjacent volume of slurry in the tank.

14. The method according to claim 13 wherein the mineralized bubbles established in the slurry at regions adjacent respective exit zones from the contactor are allowed to rise inside the slurry to promote segregation of mineral from gangue.

15. The method according to claim 10 wherein the aerated mineral feed stream comprises a combination of a fresh mineral feed stream and a variable recycled portion taken from a tailings stream from the tank.

16. The method according to claim 10 further comprising regulating a level of a slurry surface inside the tank and the depth of a froth layer on the slurry surface with a level controller.

* * * * *